United States Patent Office 3,177,145
Patented Apr. 6, 1965

3,177,145

MANGANESE COPPER FERRITE COMPOSITION CONTAINING TITANIUM AND GERMANIUM AND METHOD OF PREPARATION

James M. Brownlow, Crompond, N.Y., assignor to International Business Machines Corporation, New York, N.Y., a corporation of New York No Drawing. Filed Feb. 4, 1963, Ser. No. 256,139
9 Claims. (Cl. 252—62.5)

This invention relates to ferrite ceramic compositions which are magnetic and are used in memory and switching circuits in computer mechanisms. More particularly, it relates to a new chemical system of ferrite compositions containing the metal ions of $Fe^{+3}$, $Mn^{+2}$, $Cu^{+2}$, $Ge^{+4}$, $Ti^{+4}$, $Zn^{+2}$, $Cd^{+2}$, $Mg^{+2}$, $La^{+3}$, $Li^{+1}$, and $Bi^{+3}$. These ferrite compositions find application as high speed switching elements in computer circuitry.

In formulating magnetic materials for use in computer mechanisms, there are several recognized objectives in regard to the magnetic properties which are required to permit the operation of the material as a storage and switching device. These magnetic properties are not independent of the various modes of electrical operation that computer designers have developed. For example, in older computer memory designs, it was only a high remanence to saturation ratio ($B_r/B_s$) and a corresponding high signal-to-noise ratio that the ferrite material need exhibit in the memory circuit. Thus, the switching speed and flux density were not important limitations since the repetition rates were low.

However, in present day computer memory design, the switching speeds and repetition rates are being pushed to the highest limits by more sophisticated circuit design and modification in the ferrite materials used. There is a recognizable need for new materials to meet these requirements.

It is well known in the prior art that ferrite compositions are prepared by mixing certain oxides together to obtain thereby a reaction product. This reaction product is then formed into small toroids or plates with many apertures which are used in computer mechanisms. When these parts are to be employed as storage elements in a magnetic memory array, the electrical conductors that pass through the apertures of the toroids or of the plates are put in place after the firing process is completed. A method of magnetic memory arrays in which the ferrite is formed in situ on electrical conductors has been disclosed in an application by J. M. Brownlow and K. R. Grebe, Serial No. 206,326, filed June 29, 1962, entitled, "Arrays of Magnetic Circuit Elements and Process of Preparations." The advantages of the method disclosed herein reside in the elimination of the wiring step necessary in other older methods. Thus, the conductors are in place after firing and need only to be connected to a frame to complete the construction of a magnetic memory plane. In the new ferrite composition system that has been found, certain members have the properties necessary for operation as a memory storage element when fired at low maturing or firing temperatures. Since it is highly desirable for reasons of economy to prepare in situ magnetic memory devices containing metal conductors, it is necessary that the ferrite compositions used fire at low temperatures at 850° C. to 1250° C. or below the melting point of the electrical conductor and still possess desirable magnetic properties such as, for example, low coercive force, fast switching speed, and high remanence to saturation ratio.

Thus, the ferrite compositions of the present invention find a use in a multitude of different memory arrays as indicated above. For example, such compositions may be used in the connected array of magnetic circuit elements disclosed in the above referred to application thus achieving maximum storage capacity within a minimal space. These new ferrite compositions also have superior properties in toroid form for use in conventional memories.

The ferrite composition disclosed herein upon firing and complete reaction of the component oxides used in compounding produces a mganetic material in which the predominant crystal structure is of the cubic spinel type. Minor amounts of other phases are present in certain compositions. Two of the minor phases which have been identified in such compositions are a phase with a cubic garnet structure and a phase with an alpha $Fe_2O_3$ structure (hematite structure).

An object of the invention is to prepare a ferrite ceramic composition from the oxides and/or carbonates of $Fe^{+3}$, $Mn^{+2}$, $Cu^{+2}$, $Ge^{+4}$, $Ti^{+4}$, $Zn^{+2}$, $Cd^{+2}$, $Mg^{+2}$, $La^{+3}$, $Li^{+1}$, and $Bi^{+3}$.

Another object of the invention is to provide ferrite compositions containing the metal ions of $Fe^{+3}$, $Mn^{+2}$, $Cu^{+2}$, $Ge^{+4}$, $Ti^{+4}$, $Zn^{+2}$, $Cd^{+2}$, $Mg^{+2}$, $La^{+3}$, $Li^{+1}$, and $Bi^{+3}$ which have the desirable properties of fast switching speed and high $B_r/B_s$ ratio.

Still another object of the present invention is to provide ferrite compositions which mature at low firing temperatures.

A further object of the invention is to provide ferrite compositions which can be fired surrounding one or more electrical conductors to form a connected magnetic memory array.

The foregoing and other objects, features, and advantages of the invention will be apparent from the following more particular description of the preferred embodiments of the invention.

The range of ferrite compositions found to be within the scope of the invention are described by the following formula expressed in atom numbers:

$$Fe_xMn_yCu_zGe_aTi_bZn_cCd_dMg_eLa_fLi_gBi_hO_4$$

wherein $$x+y+z+a+b+c+d+e+f+g+h=3$$
$$0.05 \leqq a+b \leqq 0.15$$
$$0.05 \leqq c+d \leqq 0.50$$

and $x=1.45–2.00$
$y=0.10–1.05$
$z=0.20–0.45$
$a=0.00–0.15$
$b=0.00–0.15$
$c=0.00–0.50$
$d=0.00–0.50$
$e=0.00–0.20$
$f=0.00–0.02$
$g=0.00–0.20$
$h=0.00–0.03$ A ferrite ceramic composition is defined and understood by those skilled in the art to be the oxide material which results from the heating (firing) and reaction of the component oxides and/or carbonates used in preparing the ferrite composition.

The formulation and processing of these materials follow procedures well known in the art. In some instances, a two step cooling enhances the $B_r/B_s$ ratio.

In some instances, when both Ge and Cd or both Ge and Zn are present in the ferrite ceramic composition at concentrations greater than 0.05 atom numbers, two-phase sytsem is produced in which a minor amount of a non-spinel phase is present in addition to the major amount of spinel. When Ge and Cd are both present, the minor non-spinel phase has been identified to have the cubic garnet structure. The approximate composition of the minor phase garnet is $Cd_3Ge_3Fe_2O_{12}$. The presence of a minor amount of these non-spinel phases in no way detracts from their desirable magnetic properties. Examples of formulas expressed in atom numbers which produce two-phase magnetic ferrites are $$Fe_xMn_yCu_zGe_aTi_bZn_cCd_dLa_fLi_gBi_hO_4$$

wherein

| Formula Number | x | y | z | a | b | c | d | f | g | h |
|---|---|---|---|---|---|---|---|---|---|---|
| G146 | 1.55 | 0.84 | 0.33 | 0.05 | 0.03 | 0.00 | 0.02 | 0.00 | 0.00 | 0.00 |
| G148 | 1.50 | 0.94 | 0.03 | 0.08 | 0.00 | 0.00 | 0.18 | 0.00 | 0.00 | 0.00 |
| G122 | 1.55 | 0.86 | 0.33 | 0.09 | 0.00 | 0.00 | 0.15 | 0.01 | 0.00 | 0.00 |
| G141 | 1.55 | 0.82 | 0.33 | 0.15 | 0.00 | 0.00 | 0.15 | 0.00 | 0.00 | 0.00 |
| G200 | 1.60 | 0.77 | 0.22 | 0.10 | 0.00 | 0.15 | 0.00 | 0.00 | 0.15 | 0.01 |

While the firing is critical, the invention is in the unique compositions of the ferrite which exhibits a desired combination of magnetic properties, namely, high performance when used as magnetic storage elements; high $B_r/B_s$ ratio; low final firing temperature suitable for fabricating pre-wired magnetic memory elements.

The ferrite ceramic compositions of the invention may be prepared by mixing together oxide and/or carbonates of $Fe^{+3}$, $Mn^{+2}$, $Cu^{+2}$, $Ge^{+4}$, $Ti^{+4}$, $Zn^{+2}$, $Mg^{+2}$, $La^{+3}$, $Li^{+1}$, and $Bi^{+3}$, in the amounts shown in Table I, III and V to form a mixture. Ordinarily this mixture is subjected to an elevated firing temperature from 850° C. to 1250° C. for up to 60 hours in an atmosphere containing oxygen to form the ferrite ceramic composition. Thereafter, the ferrite ceramic composition may be cooled by air quenching. In some cases, a second firing step is used involving a rapid reheating to a temperature lower than the first firing temperature for a specific time and then air quenching. The same results are also obtained by furnace cooling to a second lower temperature and then quenching. Ordinarily, in the two-step method, the second firing temperature is 70° C. to 400° C. lower than the first firing temperature and the second firing time varies from 3 minutes to 12 hours.

In order to aid one skilled in the art in comprehending the invention, a comparison of magnetic properties of well-known ferrite ceramic compositions currently commercially available in the art with the magnetic properties of specific examples of the ferrite ceramic compositions of the invention is made. The composition and method of preparation of the ferrite ceramic compositions of the invention and the prior art are set forth in the specific examples in Tables I–VI. The examples of the ferrite ceramic compositions of the invention are arranged under the various types of magnetic arrays, i.e., the 2-dimensional, 3-dimensional conventional memories and the batch memory array as disclosed in copending applications by R. F. Elfant et al., Serial No. 206,356, filed June 29, 1962, entitled, "Magnetic Memory"; R. F. Elfant et al., Serial No. 250,908, filed January 11, 1963, entitled, "Magnetic Element and Memory"; and the above-mentioned application Serial No. 206,326 used in computer mechanisms. The testing procedures for these various memory systems used to evaluate the magnetic properties of the ferrite ceramic compositions of the prior art and invention are explained. The following procedure was used in preparing toroidal shaped specimens so that comparative test data could be obtained with respect to their magnetic properties.

The initial mixture is prepared by weighing and mixing the component materials in a finely divided form as specified for any of the formula numbers set forth in Tables I, III, and V. This mixture is then homogenized for four hours in a ball mill with alcohol (for example, ethyl alcohol) as the suspending agent. The alcohol is removed by drying and the mixture is calcined at 800° C. for the period of time of one hour. This calcined mixture is again milled in a ball mill with water and 3% by weight of a binder (for example, polyvinyl alcohol) for a period of time sufficient (usually 4 to 16 hours) to reduce the particle size of the calcined mixture to about one micron. This material is then dried and reduced to a powder. The powder is used to form toroid sample shapes by pressing in a steel die of suitable design at a pressure of 20,000 pounds per square inch. Next, the toroid shapes or bodies are fired and cooled according to the time and temperature scheduled specified in Tables I, III and V.

The ferrite ceramic compositions prepared as shown in Tables I, III and V have the composition expressed in atom numbers and magnetic properties set forth in Tables II, IV and VI for each of the respective formula numbers.

A particular memory system design places a concise restriction on the ferrite cores which can be used in that system. While a given ferrite composition can be variously fired to produce a range of coercive force (the highest obtainable being 4 or 5 times the lowest obtainable) it is generally found that the optimum performance is obtained in a narrow range of coercive force. Thus the particular test conditions chosen for the 2D memory specification require the ferrite to have a coercive force from 2.4 to 2.8 oersteds. In the 3D specification the coercive force of the ferrite used should be between 3.4 and 4.0 oersteds. The batch fabricated memory designs require low coercive force ferrite, 0.3 to 1.5 oersteds. It is still true that when all three memory system types are designed to function at the highest speed it is necessary to select compositions which are inherently fast switching.

Examples 1–7 appearing in Tables I and II are compositions which have been evaluated for use in 2D memory. Examples 1–4 are previously known to have utility in computer memory mechanisms (for example NCM is a composition of U.S. Patent 2,818,387). Examples 5–7 are examples of the ferrite ceramic composition of the invention.

The cores tested in the 2D memory had an internal diameter of 19.5 mils and an outer diameter of 30 mils and were 6.5 mils high. The following is a description of the test used to obtain the magnetic properties listed for each of the specified formulas in Table II.

2D or 2-dimensional storage elements are arranged in a plane. Any element may be selected by two directions of excitation by two conductors passing through that storage element. The current used in storing a one state is the sum of two currents $I_W$ (the word current) and $I_b$ (the bit current) $I_W$ was 300 ma., $I_b$ was 310 ma. The current used to store a zero state is $I_W$=330 ma. The current $I_R$ used to read a stored one state is opposite in polarity to the writing currents and was $I_R$=810 ma. The same current was used to read a stored zero state. The currents were changed by ±10% to generate the worst case conditions for reading a one voltage and a zero voltage. The ratio of these voltages is called a 1/0 ratio and should be above 3 to satisfy the memory specification. Materials with ratios below 3 are more unsuitable.

The $B_r/B_s$ ratio is the ratio of the remanent flux to saturation flux when measured on a 60 cycle B vs. field loop tracer. The toroids used for these tests had coercive forces between 2.4–2.8 oersteds.

TABLE I

*2D memory*

INITIAL MIXTURE IN GRAMS AND FIRING TREATMENT

| Ex. No. | Formula Number | Weight in Grams | | | | | | | Step I[1] | | Step II[1] | |
|---|---|---|---|---|---|---|---|---|---|---|---|---|
| | | $Fe_2O_3$ | $MnCO_3$ | CuO | $TiO_2$ | ZnO | $La_2O_3$ | MgO | Temp., °C. | Time, Min. | Temp., °C. | Time, Min. |
| 1 | NCM | 13.70 | 13.55 | 0.86 | | | | | 1,205 | 5 | 975 | 5 |
| 2 | 6B1 | 12.40 | 12.85 | 0.62 | | 1.84 | | | 1,160 | 10 | 980 | 30 |
| 3 | K197 | 12.00 | 12.60 | 0.80 | | 1.63 | | 0.40 | 1,200 | 10 | 970 | 25 |
| 4 | X73 | 12.00 | 11.50 | 2.40 | | 1.63 | | | 1,140 | 10 | 900 | 3 |
| 5 | G70a | 12.16 | 10.30 | 2.40 | 0.80 | 1.38 | 0.24 | | 1,140 | 10 | 900 | 3 |
| | G70b | 12.16 | 10.30 | 2.40 | 0.80 | 1.38 | 0.24 | | 1,025 | 140 | 900 | 3 |
| | F70c | 12.16 | 10.30 | 2.40 | 0.80 | 1.38 | 0.24 | | 1,000 | 900 | 900 | 3 |
| 6 | G101 | 12.08 | 12.10 | 1.84 | 0.80 | 0.81 | 0.24 | | 1,160 | 20 | 900 | 3 |
| 7 | G113 | 12.08 | 10.10 | 2.56 | 0.88 | 1.38 | 0.24 | | 1,140 | 10 | 900 | 3 |

[1] Firing done in air atmosphere. The samples are air quenched after each step.

TABLE II

*Final compositions in atom numbers and magnetic properties for system*

$Fe_xMn_yCu_zGe_aTi_bZn_cCd_dMg_eLa_fLi_gBi_hO_4$

| Ex. No. | Formula Number[1] | Atom Numbers | | | | | | | 1/0 | $B_r/B_s$ | $t_s$[2] (Nanoseconds) |
|---|---|---|---|---|---|---|---|---|---|---|---|
| | | x | y | z | b | c | e | f | | | |
| 1 | NCM | 1.713 | 1.180 | 0.107 | | | | | 1.3 | 0.83 | <180 |
| 2 | 6B1 | 1.550 | 1.145 | 0.078 | | 0.227 | | | 2.5 | 0.80 | <180 |
| 3 | K197 | 1.50 | 1.10 | 0.10 | | 0.20 | 0.10 | | 2.5 | 0.80 | <180 |
| 4 | X73 | 1.50 | 1.00 | 0.30 | | 0.20 | | | 1.0 | 0.52 | <180 |
| 5 | G70a | 1.52 | 0.90 | 0.30 | 0.10 | 0.17 | | 0.01 | 4.5 | 0.83 | <180 |
| | G70b | 1.52 | 0.90 | 0.30 | 0.10 | 0.17 | | 0.01 | 4.4 | 0.83 | <180 |
| | G70c | 1.52 | 0.90 | 0.30 | 0.10 | 0.17 | | 0.01 | 4.6 | 0.83 | <180 |
| 6 | G101 | 1.51 | 1.05 | 0.23 | 0.10 | 0.10 | | 0.01 | 3.5 | 0.88 | <180 |
| 7 | G113 | 1.51 | 0.88 | 0.32 | 0.11 | 0.17 | | 0.01 | 6.0 | 0.82 | <180 |

[1] These are the final ferrite ceramic compositions obtained by treating mixtures given in Table I according to firning treatment set forth therein.
[2] The duration of the current pulse used to induce switching was 180 nanoseconds. The ferrite must switch in a time less than 180 nanoseconds.

Table II demonstrates that the materials of the invention (Examples 5–7) have a high 1/0 ratio and are superior in this respect to the materials previously known (Examples 1–4). The highest 1/0 ratio obtained (Example 7) is 2.25 times the best 1/0 ratio obtained for the previously known materials (Examples 2 and 3). The 1/0 ratio is the most critical magnetic property determining as it does the suitability of the material for high speed 2D memory applications. The time to switch was less than 180 nanoseconds and a material must satisfy this requirement in order to be of value in high speed 2D memory applications. The $B_r/B_s$ ratio is sufficiently high to indicate the usefulness of these materials in 2D and other memory systems. The materials in Examples 1–4 when subjected to slow speed memory test specifications show higher 1/0 ratios than those obtained on this 2D test. The ferrite ceramic compositions of the invention exhibit a 1/0 ratio proportionately higher when subjected to slow speed memory test specifications.

Examples 8–35 appearing in Tables III and IV are compositions which have been evaluated for use in the 3D memory in computer mechanisms.

The ferrite ceramic compositions of Examples 14–35 prepared, as shown in Table III, exhibit the desired combination of magnetic properties and have the compositions as expressed in atom numbers as set forth in Table IV. Examples 8–13 are ferrite compositions previously known.

Cores with an interior diameter of 19.5 mils and an outer diameter of 30 mils and a height of 6.5 mils were tested in a 3D memory under the following conditions.

3D is the abbreviation used for 3 dimensional storage systems. All storage elements are arranged in a cubic or a rectangular parallelepiped array. Three directions of selection provide access to any single storage element. These directions are in orthogonal relationship and require the excitation of two or three conductors passing thru each storage element.

The currents used in reading and writing ($I_F$) are the sum of 2 currents (half select currents $I_D$). Because of marginal changes in the currents the worst case testing used to evaluate individual cores is carried out at $I_F$=900 ma. instead of 1000 ma. and $I_D$=550 instead of 500 ma. A stored one signal is the voltage generated on a sense winding when a current of 900 ma. is impressed on the drive winding. A zero signal is the voltage recorded when a stored zero state is read by a current of $I_F$=900 ma. The ratio of the one output signal to the zero output signal is called the 1/0 ratio and this ratio should be greater than 4.0 in order for the memory system to be economically operable. The duration of the current pulses was 500 nanoseconds and the rise time was 50 nanoseconds. The time to switch ($t_s$) is expressed in nanoseconds and is measured from the waveform of a one output signal between 10% points.

The toroids which were used to obtain the data in Table IV had coercive forces in the range 3.6 to 4.0 oersteds.

TABLE III

*3D memory*

INITIAL MIXTURE IN GRAMS AND FIRING TREATMENT

| Ex. No. | Formula Number | Weight in Grams | | | | | | | | | | | Step I | | Step II |
|---|---|---|---|---|---|---|---|---|---|---|---|---|---|---|---|
| | | $Fe_2O_3$ | $MnCO_3$ | CuO | $GeO_2$ | $TiO_2$ | ZnO | CdO | $La_2O_3$ | MgO | NiO | $Cr_2O_3$ | Temp., ° C. | Time, Min. | Cool to (temp. ° C.) and then air quench |
| 8 | CM | 14.80 | 12.20 | 0.72 | | | | | | | | | 1,080 | 5 | 870 |
| 9 | NCM | 13.70 | 13.55 | 0.86 | | | | | | | | | 1,050 | 5 | 800 |
| 10 | K109 | 13.00 | 14.50 | | | | | | | | 0.47 | 0.43 | 1,100 | 5 | 840 |
| 11 | K137 | 12.60 | 14.50 | | | | | | | | 0.79 | 0.54 | 1,100 | 5 | 800 |
| 12 | K147 | 13.40 | 14.20 | | | | | | | | 0.16 | 0.54 | 1,120 | 10 | 800 |
| 13 | B97 | 13.60 | 12.70 | | | | | | | 0.80 | | | 1,130 | 2 | 860 |
| 14 | G122 | 12.50 | 9.90 | 2.64 | 0.94 | | | 1.92 | 0.24 | | | | 1,000 | 2 | Quenched |
| 15 | ZG122 | 12.50 | 9.90 | 2.64 | 0.94 | | 1.22 | | 0.24 | | | | 1,020 | 3 | 870 |
| 16 | G135 | 12.60 | 9.60 | 2.92 | 0.84 | | | 1.28 | 0.24 | | | | 1,010 | 3 | 840 |
| 17 | G138 | 13.70 | 7.83 | 2.88 | 0.94 | | | 1.92 | 0.29 | | | | 1,080 | 2 | 870 |
| 18 | G139 | 12.50 | 7.83 | 2.24 | 1.05 | | | 2.56 | 0.29 | | | | 1,020 | 2.5 | 820 |
| 19 | G150 | 13.60 | 7.48 | 3.20 | 0.94 | | | 1.92 | 0.36 | | | | 1,020 | 6 | 840 |
| 20 | G152 | 13.50 | 7.66 | 2.88 | 1.26 | | | 1.92 | 0.29 | | | | 1,050 | 3.5 | 860 |
| 21 | G153 | 13.50 | 7.44 | 2.88 | 1.46 | | | 1.92 | 0.29 | | | | 1,050 | 3.5 | 860 |
| 22 | G104 | 11.60 | 11.30 | 2.40 | | 0.96 | 1.22 | | | | | | 1,050 | 10 | 860 |
| 23 | G64 | 12.90 | 10.10 | 2.32 | | 0.80 | | | 0.48 | | | | 1,140 | 3 | 860 |
| 24 | G102 | 12.10 | 12.10 | 1.84 | | 0.80 | | | 0.24 | | | | 1,050 | 5 | 860 |
| 25 | G105 | 12.80 | 9.43 | 3.20 | | 0.64 | | | | | | | 1,030 | 4 | 880 |
| 26 | G107 | 12.10 | 10.10 | 2.40 | | 0.80 | | | 0.24 | 0.80 | | | 1,150 | 2 | 860 |
| 27 | G117 | 11.90 | 10.70 | 2.48 | | | 1.38 | | 0.24 | | | | 1,015 | 3 | Quenched |
| 28 | G118 | 12.10 | 9.67 | 2.80 | | 0.72 | | 1.28 | 0.24 | 0.40 | | | 1,060 | 4 | 860 |
| 29 | G119 | 12.50 | 8.75 | 3.20 | | 0.72 | | 1.03 | 0.24 | 0.40 | | | 1,060 | 8 | 860 |
| 30 | G120 | 12.50 | 9.67 | 3.60 | | 0.72 | | 0.64 | 0.24 | | | | 1,060 | 8 | 860 |
| 31 | G121 | 12.50 | 9.67 | 3.20 | | 0.72 | | 1.28 | 0.24 | | | | 1,040 | 4 | 860 |
| 32 | G123 | 12.80 | 9.31 | 3.20 | 0.84 | | | 1.28 | 0.24 | | | | 1,000 | 2 | 860 |
| 33 | G126 | 12.37 | 9.77 | 3.20 | | 0.80 | | 1.28 | 0.05 | | | | 1,000 | 5 | Quenched |
| 34 | G127 | 12.80 | 9.24 | 3.20 | | 0.72 | | 1.28 | 0.07 | | | | 1,000 | 5 | Quenched |
| 35 | G128 | 12.75 | 9.20 | 3.20 | | 0.49 | | 1.28 | 0.12 | | | | 970 | 10 | Quenched |

TABLE IV

*3D memory*

FINAL COMPOSITIONS IN ATOM NUMBERS AND MAGNETIC PROPERTIES FOR SYSTEM $Fe_xMn_yCu_zGe_aTi_bZn_cCd_dMg_eLa_fLi_gBi_hO_4$

| Ex. No. | Formula Number[1] | Atom Numbers | | | | | | | | | | | 1/0 | $t_s$[2] (Nanoseconds) |
|---|---|---|---|---|---|---|---|---|---|---|---|---|---|---|
| | | x | y | z | a | b | c | d | e | f | Ni | Cr | | |
| 8 | CM | 1.85 | 1.06 | 0.09 | | | | | | | | | 1.10 | (2) |
| 9 | NCM | 1.713 | 1.180 | 0.107 | | | | | | | | | 2.60 | 220 |
| 10 | K109 | 1.62 | 1.26 | | | | | | | | 0.06 | 0.06 | 1.22 | (2) |
| 11 | K137 | 1.57 | 1.26 | | | | | | | | 0.10 | 0.07 | 2.50 | 225 |
| 12 | K147 | 1.68 | 1.23 | | | | | | | | 0.02 | 0.07 | 1.10 | (2) |
| 13 | B97 | 1.70 | 1.10 | | | | | | 0.20 | | | | 3.20 | 234 |
| 14 | G122 | 1.56 | 0.86 | 0.33 | 0.09 | | | 0.15 | | 0.01 | | | 6.80 | 230 |
| 15 | ZG122 | 1.56 | 0.86 | 0.33 | 0.09 | | 0.15 | | | 0.01 | | | 6.50 | 230 |
| 16 | G135 | 1.580 | 0.835 | 0.365 | 0.085 | | | 0.125 | | 0.010 | | | 7.80 | 266 |
| 17 | G138 | 1.712 | 0.680 | 0.360 | 0.090 | | | 0.150 | | 0.012 | | | 6.80 | 210 |
| 18 | G139 | 1.562 | 0.680 | 0.280 | 0.100 | | | 0.200 | | 0.012 | | | 5.60 | 203 |
| 19 | G150 | 1.695 | 0.650 | 0.400 | 0.090 | | | 0.150 | | 0.015 | | | 5.20 | 245 |
| 20 | G152 | 1.692 | 0.666 | 0.360 | 0.120 | | | 0.150 | | 0.012 | | | 5.40 | 254 |
| 21 | G153 | 1.692 | 0.646 | 0.360 | 0.140 | | | 0.150 | | 0.012 | | | 4.60 | 250 |
| 22 | G104 | 1.45 | 0.98 | 0.30 | | 0.12 | 0.15 | | | | | | 4.00 | 260 |
| 23 | G64 | 1.62 | 0.88 | 0.20 | | 0.10 | 0.10 | | | 0.02 | | | 4.00 | 300 |
| 24 | G102 | 1.51 | 1.05 | 0.23 | | 0.10 | 0.10 | | | 0.01 | | | 4.00 | 310 |
| 25 | G105 | 1.60 | 0.82 | 0.40 | | 0.08 | 0.10 | | | | | | 4.80 | 260 |
| 26 | G107 | 1.51 | 0.88 | 0.30 | | 0.10 | | | 0.20 | 0.01 | | | 9.00 | 410 |
| 27 | G117 | 1.49 | 0.93 | 0.31 | 0.09 | | 0.17 | | | 0.01 | | | 5.00 | 210 |
| 28 | G118 | 1.51 | 0.84 | 0.35 | | 0.09 | | 0.10 | 0.10 | 0.01 | | | 6.10 | 290 |
| 29 | G119 | 1.56 | 0.76 | 0.40 | | 0.09 | | 0.08 | 0.01 | 0.01 | | | 13.00 | 440 |
| 30 | G120 | 1.56 | 0.84 | 0.45 | | 0.09 | | 0.05 | | 0.01 | | | 13.00 | 400 |
| 31 | G121 | 1.56 | 0.84 | 0.40 | | 0.09 | | 0.10 | | 0.01 | | | 7.70 | 330 |
| 32 | G123 | 1.60 | 0.81 | 0.40 | 0.08 | | | 0.10 | | 0.01 | | | 13.00 | 300 |
| 33 | G126 | 1.548 | 0.850 | 0.400 | | 0.100 | | 0.100 | | 0.002 | | | 5.00 | 270 |
| 34 | G127 | 1.603 | 0.804 | 0.400 | | 0.090 | | 0.100 | | 0.003 | | | 4.00 | 270 |
| 35 | G128 | 1.595 | 0.800 | 0.400 | 0.30 | 0.070 | | 0.100 | | 0.005 | | | 7.80 | 340 |

[1] These are the final ferrite ceramic compositions obtained by treating mixtures given in Table III according to firing treatment set forth therein.
[2] Switching time can not be measured because of the unstable stored "1" state.

Table IV shows that the ferrite ceramic compositions of the invention (Examples 14–35) have a high 1/0 ratio and are superior in this respect to the materials previously known (Examples 8–13). The 1/0 ratio is the most critical magnetic property determining as it does the suitability of the material for both high speed and medium speed 3D memory applications. The switching time ($t_s$) indicates the suitability of a material for high speed or medium speed 3D memory applications. It is to be noted that Examples 14, 15, 17, 18, 19, 21 and 27 all have a switching time equal to or less than 250 nanoseconds and are therefore suitable for high speed 3D memory. The other examples with longer switching time find utility in medium speed 3D memory applications as well.

It has also been found that ferrite ceramic compositions of the invention can be fired at low firing temperatures and are thus useful in the preparation in batch memory arrays with inexpensive electrical conductors, such as copper or copper containing alloys, silver or silver containing alloys, and do not suffer any loss of magnetic properties. These ferrite formulas may also be used with the more expensive high temperature platinum conductors as well. The process using these ferrite ceramic compositions in the fabricating of connected sintered ferrite array of magnetic storage elements or as commonly called batch memory arrays is that set forth in the above indentified patent application, Serial No. 206,326, which is incorporated herein by reference.

This process of application, Serial No. 206,326, involves depositing a first continuous coating of a separator material on the surface of a conductor, then a second continuous coating of a ferrite thermosetting resin mixture is deposited on said separator material. Thus, a multiple coated conductor is then heated to a predetermined temperature at which said ferrite thermosetting resin mixture obtains sufficient mechanical strength to become self-supporting. The separating material is then removed, and the coated conductor is heated to its final sintering temperature. Thus, prewired magnetic memory arrays may be fabricated which eliminate the necessity of wiring after firing.

When these ferrite ceramic compositions are made into batch fabricated memory devices, it is difficult to determine uniquely the *Hc* and $B_r/B_s$ ratio and the firing temperature range. These properties are more easily determined in specimens having toroidal form.

Since silver conductors have the desired combination of properties, for example, resistance to oxidation, high electrical conductivity, the experimental development of ferrite ceramic compositions was directed toward achieving low coercive force and high $B_r/B_s$ ratio under firing conditions of 920° C. for one hour (silver melts at 960° C.)

Table V presents the weights used in compounding the ferrites and the firing treatment used.

Table VI gives the final composition in atom numbers and allows comparision of the magnetic properties found in ferrite materials of the invention and in ferrite compositions previously known in the art.

The Examples 36 through 45 show that the materials of the invention sinter to low coercive force when fired at 920° C. for one hour. The materials previously known in the art Examples 46–48 do not sinter or achieve low coercive force at 920° C. In fact firing these types of ferrites for many hours does not bring about sufficient sintering to yield low coercive force.

Examples 43 and 44 show that the firing temperature can be as low as 850° C.

By virtue of the low firing temperature, it becomes possibe to prepare a composite device composed of ferrite ceramic composition having prewired therein a copper or silver metal containing conductor which renders more economical all batch magnetic memory arrays.

TABLE V

*Batch memory*

| Ex. No. | Formula Number | Weight in Grams | | | | | | | | | Firing Treatment [1] | |
|---|---|---|---|---|---|---|---|---|---|---|---|---|
| | | $Fe_2O_3$ | $MnCO_3$ | CuO | $GeO_2$ | ZnO | CdO | $Bi_2O_3$ | $Li_2O$ | MgO | Temp., ° C. | Time, Min. |
| 36 | G130 | 15.20 | 2.30 | 3.20 | 1.05 | ----- | 6.40 | ----- | ----- | ----- | 920 | 60 |
| 37 | G174 | 15.40 | 2.30 | 3.20 | 0.10 | 3.25 | ----- | 0.233 | 0.183 | ----- | 920 | 60 |
| 38 | G186 | 15.20 | 1.96 | 2.72 | 0.09 | 3.76 | ----- | 0.233 | 0.148 | ----- | 920 | 60 |
| 39 | G217 | 14.40 | 3.56 | 3.20 | 1.05 | 3.25 | ----- | 0.233 | 0.481 | ----- | 920 | 60 |
| 40 | G203 | 16.000 | 1.150 | 2.400 | 0.105 | 3.760 | ----- | 0.732 | 0.370 | ----- | 920 | 60 |
| 41 | G202 | 13.60 | 7.13 | 1.76 | 1.05 | 1.22 | ----- | 0.233 | 0.74 | ----- | 920 | 60 |
| 42 | G192 | 12.800 | 8.400 | 2.640 | 1.050 | ----- | 1.920 | 0.350 | 0.264 | ----- | 920 | 60 |
| 43 | G197a | 12.40 | 9.67 | 1.60 | 1.05 | 1.22 | ----- | 0.233 | 0.555 | ----- | 920 | 60 |
| | G197b | 12.40 | 9.67 | 1.60 | 1.05 | 1.22 | ----- | 0.233 | 0.555 | ----- | 850 | 60 |
| | G197c | 12.40 | 9.67 | 1.60 | 1.05 | 1.22 | ----- | 0.233 | 0.555 | ----- | 920 | 900 |
| 44 | G200a | 12.80 | 8.86 | 1.76 | 1.05 | 1.22 | ----- | 0.233 | 0.555 | ----- | 920 | 60 |
| | G200b | 12.80 | 8.86 | 1.76 | 1.05 | 1.22 | ----- | 0.233 | 0.555 | ----- | 850 | 60 |
| | G200c | 12.80 | 8.86 | 1.76 | 1.05 | 1.22 | ----- | 0.233 | 0.555 | ----- | 850 | 960 |
| 45 | G214 | 12.80 | 7.82 | 2.00 | 0.80 | 2.03 | ----- | 0.233 | 0.48 | ----- | 920 | 60 |
| 46 | 6B1 | 12.40 | 12.85 | 0.62 | ----- | 1.85 | ----- | ----- | ----- | ----- | 920 | 60 |
| 47 | NCM | 13.70 | 13.55 | 0.86 | ----- | ----- | ----- | ----- | ----- | ----- | 920 | 60 |
| 48 | K197 | 12.00 | 12.60 | 0.80 | ----- | 1.63 | ----- | ----- | ----- | 0.40 | 920 | 60 |

[1] Firing done in air atmosphere. The samples are then air quenched.

TABLE VI

*Batch memory*

FINAL COMPOSITIONS IN ATOM NUMBERS AND MAGNETIC PROPERTIES FOR SYSTEM $Fe_xMn_yCu_zGe_aTi_bZn_cCd_dMg_eLa_fLi_gBi_hO_4$

| Ex No. | Formula [1] Number | Atom Numbers | | | | | | | | | $B_r/B_s$ | $H_c$ (Oersteds) |
|---|---|---|---|---|---|---|---|---|---|---|---|---|
| | | x | y | z | a | c | d | e | h | g | | |
| 36 | G130 | 1.90 | 0.20 | 0.40 | 0.01 | ----- | 0.50 | ----- | ----- | ----- | 0.50 | 1.00 |
| 37 | G174 | 1.93 | 0.20 | 0.40 | 0.01 | 0.40 | ----- | ----- | 0.01 | 0.05 | 0.71 | 1.00 |
| 38 | G186 | 1.90 | 0.17 | 0.34 | 0.09 | 0.45 | ----- | ----- | 0.01 | 0.04 | 0.61 | 0.60 |
| 39 | G217 | 1.80 | 0.31 | 0.25 | 0.10 | 0.40 | ----- | ----- | 0.01 | 0.13 | 0.70 | 0.50 |
| 40 | G203 | 2.00 | 0.10 | 0.30 | 0.01 | 0.46 | ----- | ----- | 0.03 | 0.10 | 0.70 | 1.00 |
| 41 | G202 | 1.70 | 0.62 | 0.22 | 0.10 | 0.15 | ----- | ----- | 0.01 | 0.20 | 0.75 | 1.40 |
| 42 | G192 | 1.600 | 0.730 | 0.330 | 0.100 | ----- | 0.150 | ----- | 0.015 | 0.075 | 0.75 | 1.30 |
| 43 | G197a | 1.55 | 0.84 | 0.20 | 0.10 | 0.15 | ----- | ----- | 0.01 | 0.15 | 0.75 | 1.30 |
| | G197b | 1.55 | 0.84 | 0.20 | 0.10 | 0.15 | ----- | ----- | 0.01 | 0.15 | 0.80 | 3.00 |
| | G197c | 1.55 | 0.84 | 0.20 | 0.10 | 0.15 | ----- | ----- | 0.01 | 0.15 | 0.75 | 1.00 |
| 44 | G200a | 1.60 | 0.77 | 0.22 | 0.10 | 0.15 | ----- | ----- | 0.01 | 0.15 | 0.77 | 1.30 |
| | G200b | 1.60 | 0.77 | 0.22 | 0.10 | 0.15 | ----- | ----- | 0.01 | 0.15 | 0.80 | 1.35 |
| | G200c | 1.60 | 0.77 | 0.22 | 0.10 | 0.15 | ----- | ----- | 0.01 | 0.15 | 0.80 | 1.35 |
| 45 | G214 | 1.60 | 0.68 | 0.25 | 0.08 | 0.25 | ----- | ----- | 0.01 | 0.13 | 0.77 | 1.00 |
| 46 | 6B1 | 1.550 | 1.145 | 0.078 | ----- | 0.227 | ----- | ----- | ----- | ----- | ----- | 40 |
| 47 | NCM | 1.713 | 1,180 | 0.107 | ----- | ----- | ----- | ----- | ----- | ----- | ----- | >40 |
| 48 | K197 | 1.50 | 1.10 | 0.10 | ----- | 0.20 | ----- | 0.10 | ----- | ----- | ----- | >40 |

[1] These are the final ferrite ceramic compositions obtained by treating mixtures given in Table V according to firing treatment set forth therein.

The unique composition of the ferrite ceramic compositions causes them to exhibit a highly desirable combination of magnetic properties, namely, high $B_r/B_s$ ratio, and low firing temperature and ability to operate in high speed 2D and 3D memory systems. These compositions are used to prepare toroids which find use as a complete magnetic array in computer mechanisms and, in addition, may be used to fabricate prewired magnetic memory arrays which thus eliminate the necessity of wiring after firing.

While the invention has been particularly shown and described with reference to preferred embodiments thereof, it will be understood by those skilled in the art that various changes in form and details may be made therein without departing from the spirit and scope of the invention.

What is claimed is:

1. A ferrite ceramic composition having a formula $$Fe_xMn_yCu_zGe_aTi_bZn_cCd_dMg_eLa_fLi_gBi_hO_4$$

wherein $$x+y+z+a+b+c+d+e+f+g+h=3$$

$$0.05 \leqq a+b \leqq 0.15$$
$$0.05 \leqq c+d \leqq 0.50$$

and $x$=1.45–2.00
$y$=0.10–1.05
$z$=0.20–0.45
$a$=0.00–0.15
$b$=0.00–0.15
$c$=0.00–0.50
$d$=0.00–0.50
$e$=0.00–0.20
$f$=0.00–0.02
$g$=0.00–0.20
$h$=0.00–0.03

2. A ferrite ceramic composition having a formula $$Fe_{1.56}Mn_{0.86}Cu_{0.33}Ge_{0.09}Cd_{0.15}La_{0.01}O_4$$

3. A ferrite ceramic composition having a formula $$Fe_{1.56}Mn_{0.86}Cu_{0.33}Ge_{0.09}Zn_{0.15}La_{0.01}O_4$$

4. A ferrite ceramic composition having a formula $$Fe_{1.52}Mn_{0.90}Cu_{0.30}Ti_{0.10}Zn_{0.17}La_{0.01}O_4$$

5. A ferrite ceramic composition having a formula $$Fe_{1.60}Mn_{0.77}Cu_{0.22}Ge_{0.10}Bi_{0.01}Zn_{0.15}Li_{0.15}O_4$$

6. A ferrite ceramic composition having a formula $$Fe_{1.60}Mn_{0.68}Cu_{0.25}Ge_{0.08}Bi_{0.01}Zn_{0.25}Li_{0.13}O_4$$

7. A method of preparing a ferrite ceramic composition having a $B_r/B_s$ ratio of at least .5 oersteds having the formula of $$Fe_xMn_yCu_zGe_aTi_bZn_cCd_dMg_eLa_fLi_gBi_hO_4$$

wherein $$x+y+z+a+b+c+d+e+f+g+h=3$$

$$0.05 \leqq a+b \leqq 0.15$$
$$0.05 \leqq c+d \leqq 0.50$$

and $x$=1.45–2.00
$y$=0.10–1.05
$z$=0.20–0.45
$a$=0.00–0.15
$b$=0.00–0.15
$c$=0.00–0.50
$d$=0.00–0.50
$e$=0.00–0.20
$f$=0.00–0.02
$g$=0.00–0.20
$h$=0.00–0.03 which comprises mixing in finely divided form oxides of Fe, Mn, Cu, Ge, Ti, Zn, Cd, Mg, La, Li, and Bi in preparations such that the ferrite ceramic composition produced by firing has the above formula; subjecting the thus formed mixture to an elevated firing temperature between 850° C. and 1200° C. for up to 60 hours in an oxygen containing atmosphere to form said ferrite ceramic composition and thereafter cooling.

8. The method of claim 7 wherein the cooling is air quenching.

9. The method of claim 8 wherein there is a second firing step following the air quenching which comprises a rapid reheating in an oxygen atmosphere to a temperature of 100° C. to 400° C. lower than the first firing temperature, holding at this lower temperature for three minutes to 16 hours, and thereafter air quenching.

References Cited by the Examiner

UNITED STATES PATENTS

| | | | |
|---|---|---|---|
| 2,818,387 | 12/57 | Beck et al. | 252—62.5 |
| 2,927,898 | 3/60 | Pawlek | 252—62.5 |
| 2,946,752 | 7/60 | Jonker et al. | 252—62.5 |
| 2,982,732 | 5/61 | Brownlow | 252—62.5 |
| 3,003,140 | 10/61 | Crane | 340—174 |

MAURICE A. BRINDISI, *Primary Examiner.*